United States Patent [19]
Jiang et al.

[11] Patent Number: 5,993,051
[45] Date of Patent: Nov. 30, 1999

[54] COMBINED LEADING ONE AND LEADING ZERO ANTICIPATOR

[75] Inventors: Shao-Kun Jiang, San Diego; Ted Nguyen, Saratogo, both of Calif.

[73] Assignee: Samsung Electronics Co., Ltd., Seoul, Rep. of Korea

[21] Appl. No.: 08/746,880

[22] Filed: Nov. 18, 1996

[51] Int. Cl.[6] .................................................... G06F 7/38
[52] U.S. Cl. ...................................................... 364/748.07
[58] Field of Search ......................... 364/748.07, 736.02, 364/715.04, 715.1, 748.11

[56] References Cited

U.S. PATENT DOCUMENTS

| | | | |
|---|---|---|---|
| 4,841,467 | 6/1989 | Ho et al. .............................. | 364/748.07 |
| 5,550,767 | 8/1996 | Taborn et al. ...................... | 364/715.04 |

OTHER PUBLICATIONS

Erdem Hokenek et al., "Second–Generation RISC Floating Point With Multiply–Add Fused," IEEE Journal of Solid–State Circuits, vol. 25, No. 5, Oct. 1990, pp. 1207–1212.

Primary Examiner—Chuong Dinh Ngo
Attorney, Agent, or Firm—Skjerven, Morrill, MacPherson, Franklin & Friel LLP; Brian D. Ogonowsky

[57] ABSTRACT

A floating point unit (FPU) is described which processes normalized binary numbers. All multiply, add, and subtract calculations are performed using the format (A*B)+C or (A*B)−C. The operation A*B is performed in parallel with the alignment of C to the product of A*B. An output of the multiplier and the aligned operand C are applied to a carry save adder, whose output is then applied to a carry propagate adder to generate the result A*B±C. The output of the carry save adder is also applied to a combined leading one anticipator (LOA) and leading zero anticipator (LZA). The output of the carry propogate adder is provided to a post normalizer. The output of the combined LOA/LZA is applied to the input of a multiplexer, with the control input of the multiplexer being connected to the most significant bit of the adder output, where this most significant bit indicates whether the result is positive or negative. The output of the multiplexer will thus reflect the leading zero count, if the output of the adder is a positive number, or the leading one count, if the output of the adder is a negative number. The resulting count is then used to normalize the result of A*B±C.

8 Claims, 7 Drawing Sheets

COMBINED LEADING ONE AND LEADING ZERO ANTICIPATOR

FIELD OF THE INVENTION

This invention relates to arithmetic processing circuits and, in particular, to a circuit which identifies and counts the leading ones and leading zeroes in a binary number along with calculating the binary number.

BACKGROUND OF THE INVENTION

Arithmetic processing circuitry for binary numbers typically employs floating point arithmetic in accordance with the IEEE 754 standard. Floating point arithmetic, used in addition, multiplication, and division, first normalizes the binary numbers to be added, multiplied, or divided by shifting the binary numbers until, for a positive number, the first non-zero digit (i.e., 1) is immediately to the left of the radix point such that the mantissa part of the binary numbers is greater than or equal to one and less than two. A negative binary number will have leading ones. Thus, to normalize a negative number, the number must be shifted so that the first zero is immediately to the left of the radix point.

For multiplication, the normalized binary numbers are then multiplied and their exponents added. For division, the normalized binary numbers are divided and their exponents subtracted. For addition and subtraction, the normalized numbers must be shifted (i.e., aligned) so that their exponents are equal, then the numbers are added or subtracted.

To normalize a binary number, the number of leading zeros (for a positive number) or leading ones (for a negative number) must be quickly determined so that the number of shifts of the binary number can be quickly performed for the next arithmetic operation. Ideally, the leading one count or leading zero count is performed in parallel with the arithmetic operation so that shifting can be performed immediately after the arithmetic operation.

What is needed is a very fast arithmetic processing circuit for generating a binary number, calculating the number of leading ones or zeroes in the number, and then shifting the number to produce a normalized binary result for a next floating point arithmetic operation.

SUMMARY

A floating point unit (FPU) is described which processes normalized binary numbers. The FPU consists of a mantissa data path and an exponential data path. All multiply, add, and subtract calculations are performed using the format $(A*B)+C$ or $(A*B)-C$. For multiplication, C is set to zero. For adding or subtracting, B is set to 1. For subtraction, the complement of C is added to the product of $A*B$ first and then a hot one is added to perform two's complement subtraction.

The operation $A*B$ is performed in parallel with the alignment of C to the product of $A*B$. An output of the multiplier and the aligned operand C are applied to a carry save adder, whose output is then applied to a carry propagate adder to generate the result $A*B\pm C$. The output of the carry save adder is also applied to a combined leading one anticipator (LOA) and leading zero anticipator (LZA). The output of the carry propagate adder is provided to a post normalizer.

The output of the combined LOA/LZA is applied to the input of a multiplexer, with the control input of the multiplexer being connected to the most significant bit of the adder output, where this most significant bit indicates whether the result is positive or negative. The output of the multiplexer will thus reflect the leading zero count, if the output of the adder is a positive number, or the leading one count, if the output of the adder is a negative number.

The output of the multiplexer is then further processed by a post normalizer count logic circuit whose output controls the post normalizer to shift the result of the $A*B\pm C$ operation to cause the result to be normalized.

The result is then complemented if it is negative, and a 1 is added to complete the two's complement subtraction.

The result is a normalized $A*B\pm C$ product.

In the preferred embodiment, the combined LOA/LZA is only utilized if it is determined that the exponents of $A*B$ and C are within two. If the exponents are not within two, the post normalization shifting is based on the exponent difference or a fixed value, thus simplifying the FPU and increasing its overall speed.

DETAILED DESCRIPTION OF THE PREFERRED EMBODIMENTS

Figure 1:
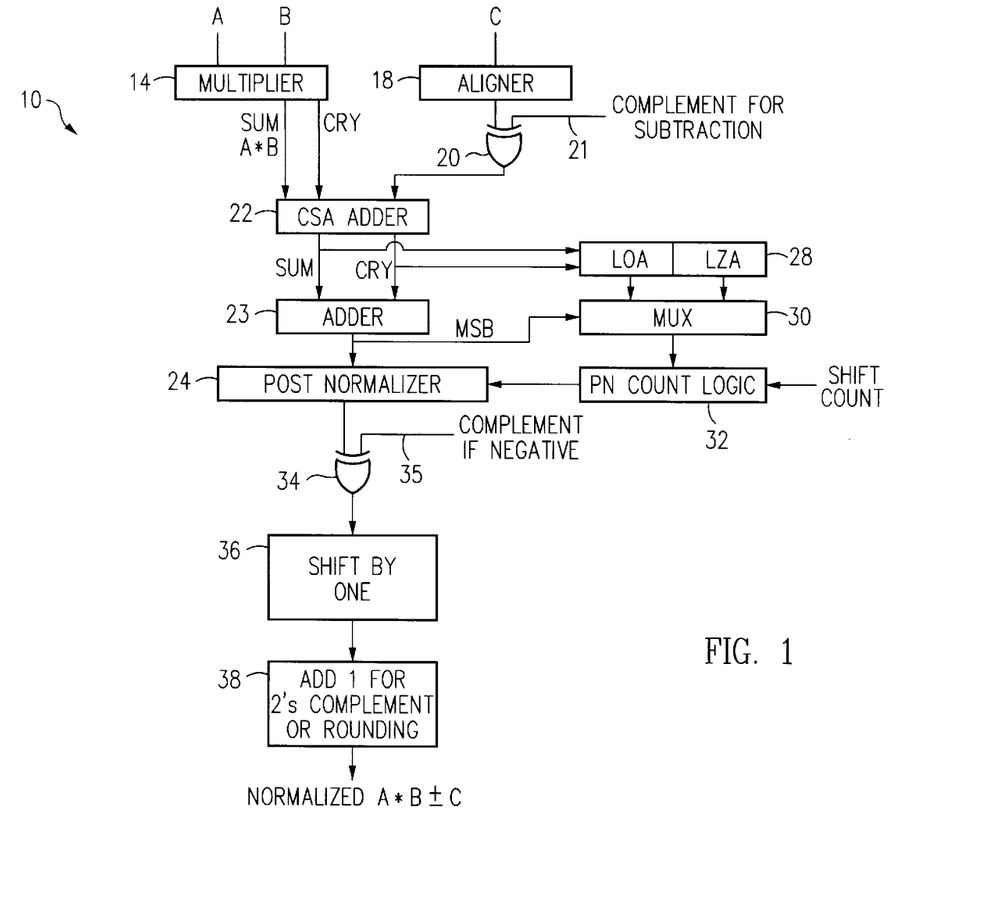
FIG. 1 is a simplified diagram of the mantissa portion of the floating point unit (FPU).

FIG. 1 is a simplified block diagram of the preferred embodiment mantissa portion 10 of the floating point unit (FPU). The mantissa portion 10 always performs the operation $A*B\pm C$ on the normalized binary numbers A, B, and C. For multiplication only, C is set to zero. For addition or subtraction only, B is set to 1. In the preferred embodiment A, B, and C are normalized in accordance with the IEEE 754 standard.

Binary numbers A and B are multiplied by multiplier 14, which may be any conventional multiplier. In the preferred embodiment, multiplier 14 is a carry save adder which provides 4 to 2 compression for each iteration until the multiplication is complete. In such a multiplier using a carry save adder, the result is a sum component and a carry component.

In parallel with this multiplication process, C is aligned by aligner 18 such that its exponent is equal to the exponent of the product of $A*B$, assuming no exponent overflow or underflow. Accordingly, after alignment, C will have an exponent equal to the sum of the exponents of A and B.

If C is to be subtracted from $A*B$, the aligned C value is complemented by the exclusive OR (XOR) gate 20, which has as one input a signal 21 indicating that the aligned C value is to be complemented. If there is no complement signal 21 applied to the XOR gate 20, the aligned C is not complemented.

The value of A*B and the positive or negated term C are then added by adders 22 and 23 to provide the result A*B±C. In the preferred embodiment, adder 22 is a carry save adder, generating a sum component and a carry component, and adder 23 adds together the sum and the carry.

The output of adder 23 is applied to an input of a post normalizer 24 for subsequently shifting the result from adder 23 into a normalized format. The output of adder 22 is applied to a combined leading one anticipator (LOA) and leading zero anticipator (LZA) 28. The LOA/LZA 28 performs logical operations for indicating the leading ones or leading zeroes of the result from adder 22. Additional detail regarding the logical operations performed by LOA/LZA 28 will be described with respect to FIG. 8. The LOA/LZA 28 outputs are coupled to a multiplexer 30.

The most significant bit (MSB) output from adder 22 indicates whether the result is a positive or negative number. An MSB of 1 indicates that the result is negative and that multiplexer 30 is to provide the leading one anticipator result to the post normalizer count logic 32. Conversely, if the MSB is 0, indicating a positive result from adder 22, multiplexer 30 then forwards the leading zero anticipator result to the post normalizer count logic circuit 32.

The post normalizer count logic circuit 32 then converts the count signal from the LOA/LZA 28 into a shift signal for the post normalizer 24. The post normalizer 24 then shifts the binary result from adder 22 into an intermediate normalized form which, for a positive number, has the first 1 bit one position to the right of the radix point and, for a negative number, has the first 0 bit one position to the right of the radix point. The shifting may be off by one due to the LOA and LZA logic being performed on one's complemented C instead of two's complemented C.

If the result is negative, the normalized number must then be complemented using an XOR gate 34 and a complement signal 35. The MSB of adder 23 identifies if such a complement is to take place and, if so, provides a logical 1 signal 35 to the input of the XOR gate 34 along with the normalized result. If the result is positive, no complementing takes place.

If MSB of the result is not a one, then the number is shifted to the left one position by shifter 36 so that the first one is immediately to the left of the radix point.

If the normalized number is negative, a 1 is then added by incrementer 38 to complete the two's complement conversion. Incrementer 38 is also used for rounding.

The output of the mantissa portion 10 in FIG. 1 is the normalized value of A*B±C.

The post normalizer 24 may simply be a shifter or any other suitable circuit. The combined LOA/LZA 28 may take many forms. In one embodiment, the LOA/LZA 28 forms a tree structure similar to that used in a carry look-ahead adder which generates the bits P (propagate), G (generate), and Z (zero). The post normalizer count logic circuit 32 thus depends on the particular interface required between the LOA/LZA 28 and the post normalizer 24.

In one embodiment, the mantissa length of A, B, and C is 23 bits long, plus an explicit and a sign bit, and the exponent values are 8 bits long plus an extended bit.

Figure 2:
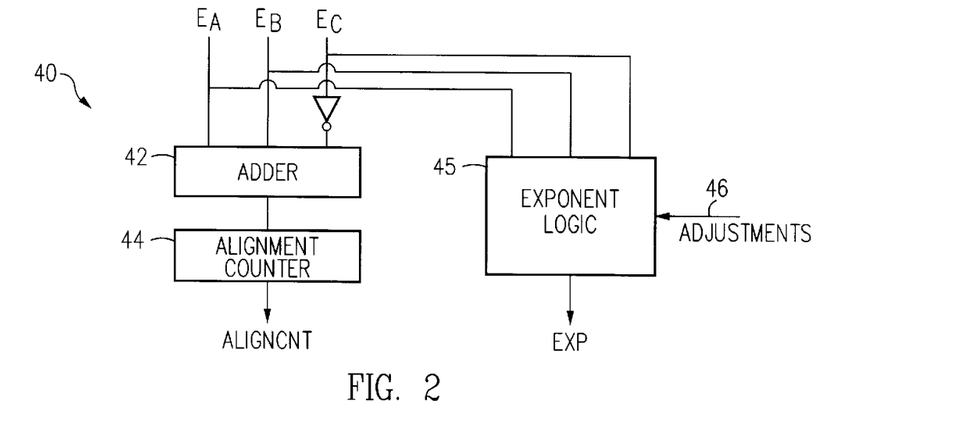
FIG. 2 is a simplified diagram of the exponent portion of the FPU.

FIG. 2 is a simplified diagram of the exponent portion 40 of the FPU for generating an alignment count.

The exponent values of A and B are applied to an adder 42 along with the complemented exponent value for C, such that the exponent of C will be subtracted from the sum of the exponents of A and B. The result is applied to an alignment counter 44, which determines the number of shifts of the mantissa portion of C by aligner 18 (FIG. 1) so that C will be aligned with the product A*B. In the preferred embodiment, to be described with respect to FIG. 3, the ALIGNCNT signal generated by the alignment counter 44 is in accordance with Table I, presented later.

Exponent logic 45 calculates the resulting exponent. An adjustment signal 46 indicates any shifting of the result A*B±C for normalization to calculate the correct exponent for the normalized result.

The output of the FPU will thus be the output of the mantissa portion 10 in combination with the exponent portion 40 as well as a sign bit.

The combination of always performing the function A*B±C, concurrently aligning C to the product of A*B, concurrently generating the leading zeroes and leading ones together with the addition/subtraction, then selecting the appropriate shift count to normalize the result of the operation A*B±C results in an extremely fast FPU.

Figure 3:
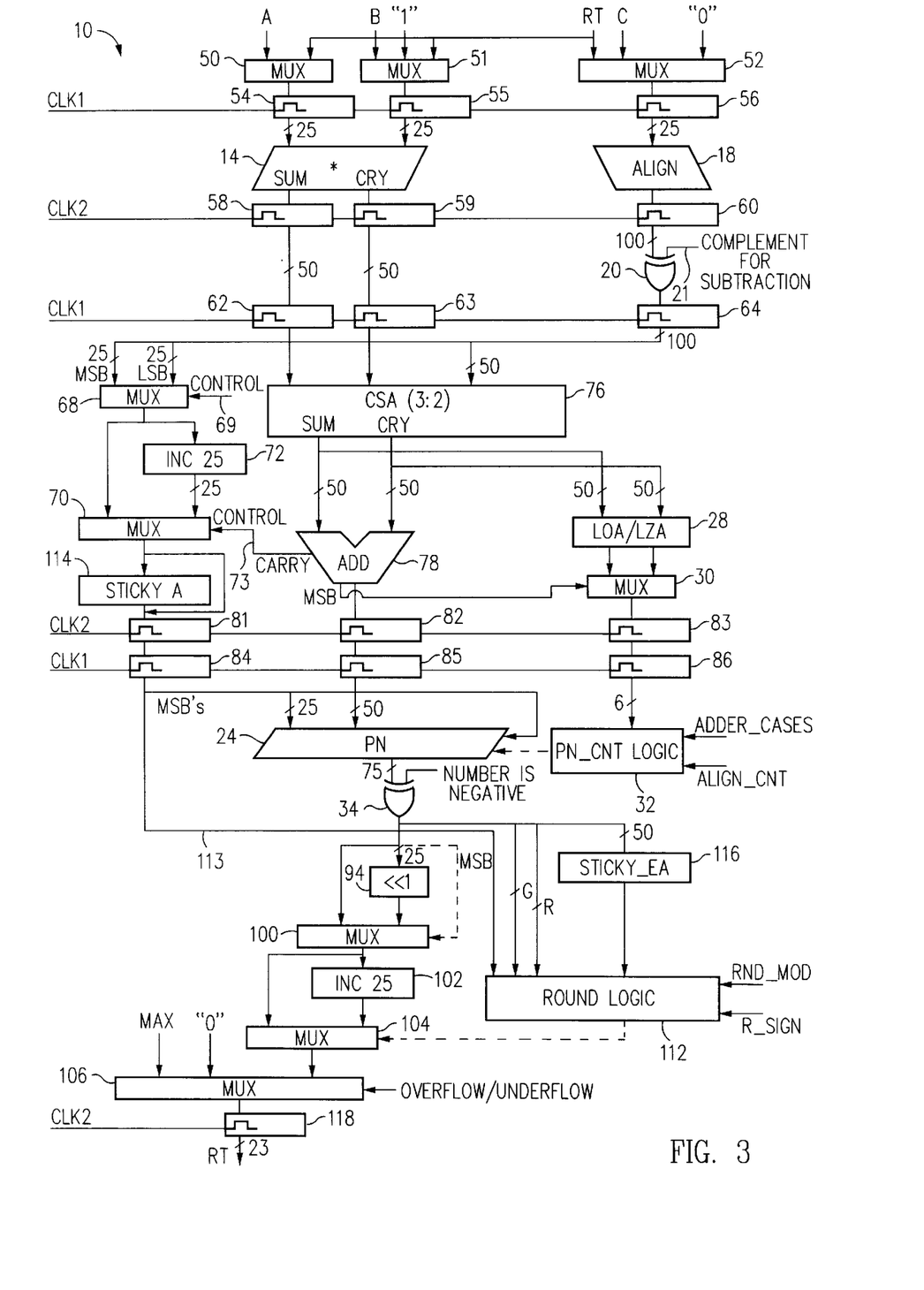
FIG. 3 is a more detailed diagram of the mantissa portion.

FIG. 3 shows in greater detail the mantissa portion 10 of the preferred embodiment FPU.

The mantissa portion 10 in FIG. 3 contains multiplexers 50, 51, and 52 for selecting the three operands for the equation A*B±C. Multiplexer 50 selects either a new value A or a result (RT) forwarded from a previous operation. Multiplexer 51 selects either the binary number B to be multiplied with A or, if the FPU is to perform the operation A+C or A−C, selects a logical 1 input. Multiplexer 52 selects either the value C, a result (RT) forwarded, or a logical 0 (if the mantissa portion 10 is to perform only the operation A*B. It will be assumed for purposes of this discussion that multiplexers 50, 51, and 52 select the values A, B, and C, respectively.

Latches in sync blocks 54, 55, and 56 receive a CLK1 signal for synchronizing the signals.

The values of A and B are then applied to the multiplier 14 which, in the preferred embodiment, is an array of carry save adders (CSA) which multiplies the values A and B in a carry save form. Other types of multipliers may also be used, and such multipliers are well known. The CSA adders perform 4:2 compression during each cycle, and the multiplier array utilizes two basic techniques: modified Booth encoding and extended Wallace (carry-save) tree. These techniques are described in the article entitled "Second-Generation RISC Floating Point with Multiply-Add Fused," by Erdem Hokenek, et al., IEEE Journal of Solid-State Circuits, Vol. 25, No. 5, October 1990, incorporated herein by reference. Multiplier 14 may be formed using the techniques described in the IEEE article along with other references cited in that article.

The output of multiplier 14 will be a sum and carry from the multiple additions.

In parallel with the multiplication, the binary number C is shifted the appropriate number of places by aligner 18 so that C will have the same exponent as the product of A*B output from multiplier 14.

Since only C is aligned with respect to the product A*B whether C is larger than A*B or not, the aligner 18, in one embodiment, appropriately shifts C in either direction. However, in the preferred embodiment, the operand C is pre-shifted to the left most position before alignment so that aligner 18 only needs to shift C to the right instead of in both directions.

Figure 4:
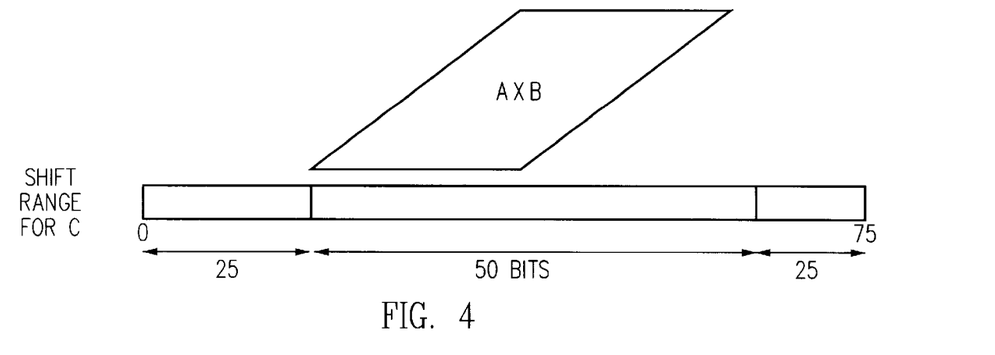
FIG. 4 illustrates the alignment shift range of the operand C.

Since, in the preferred embodiment, the mantissa portions of A and B are each 25 bits (including a sign bit), the product of A*B is 50 bits, including two encoded sign bits. Since C, before alignment, is also 25 bits, a provision must be made for C to be a maximum of 100 bits (25+50+25) after alignment to allow for either a zero shift (if C>>A*B) or a maximum right shift of 75 (if C<<A*B). Thus, the shifting range (ALIGNCNT) of operand C is zero to 75, as indicated in Table I and as illustrated in FIG. 4. By properly classifying the add/subtract cases, as in Table I, the shifting range can be simplified to one 27 position fixed shifter and one 48 variable position shifter. The number 27 is the sum of the 25 bits in C plus the two encoded sign bits in the 50 bit product of A*B. The number 48 is based on the 48 significant bits in the product A*B.

TABLE I

| $\Delta e = e_c - e_x$ | Alignment count |
|---|---|
| $\Delta e \geq 27$ (C >> A*B) | 0 |
| $27 > \Delta e > 0$ (C > A*B) | $27 - \Delta e$ |
| $\Delta e = 0,1,2,-1$ (C ≈ A*B) | $27 - \Delta e$; Mass cancellation |
| $1 > \Delta e \geq -48$ (C < A*B) | $27 - \Delta e$ |
| $-48 > \Delta e$ (C << A*B) | 75 |

This alignment of C is based upon the ALIGNCNT signal from the exponent portion 40 of the FPU to equalize the exponents of C and the product of A*B.

The outputs of multiplier 14 and aligner 18 are synchronized by CLK2 using sync circuits 58, 59, and 60.

After any complementing for subtraction by XOR gate 20, the resulting values are then synchronized with respect to the CLK1 pulse by sync circuits 62, 63, and 64.

Since the final normalized result of the mantissa portion 10 will be only 24 bits plus a sign bit, it is undesirable to perform arithmetic operations on all 100 bits of the aligned operand C. The preferred FPU uses a novel technique to reduce the complexity of the FPU and speed up certain operations. Five different relationships or cases between C and A*B exist:

1. C>>A*B
2. C>A*B
3. C≈A*B
4. C<A*B
5. C<<A*B

The format of the carry and sum terms of the multiplier 14 array output and the operand C are shown below in Table II. The bit positions are divided into three parts—part A, part B and part C. The high order bits in parts A and B need to be preserved for shifting during post normalization, while the low order bits in part C are ORed together to generate the partial sticky bit (STICKY A) after conditionally completing the conversion from one's complement to two's complement by adding one if the operation is a difference operation. A difference operation means adding operands with different signs or subtracting operands with the same signs. A sum operation means adding operands with the same signs or subtracting operands with different signs.

TABLE II

| SHIFT RANGE FOR C | 7 4 | 7 3 | 7 2 | ... | 5 1 | 5 0 | 4 9 | 4 8 | 4 7 | ... | 1 0 | 2 4 | 2 3 | 2 2 | ... | 0 |
|---|---|---|---|---|---|---|---|---|---|---|---|---|---|---|---|---|
| MUL 14 OUTPUT SUM | | | | | | | S d | S | X | X | ... | X | X | | | | |
| MUL 14 OUTPUT CRY | | | | | | | S d | S | X | X | ... | X | X | | | | |
| C C' Case a | S | 1 | X | X | ... | X | X | X | | | | | | | | | |
| C C' Case b | | | | | | | | | | | | | S | 1 | X | ... | X |
| | Part A MSB | | | | | | Part B | | | | | | Part C LSB | | | |

Figure 5:
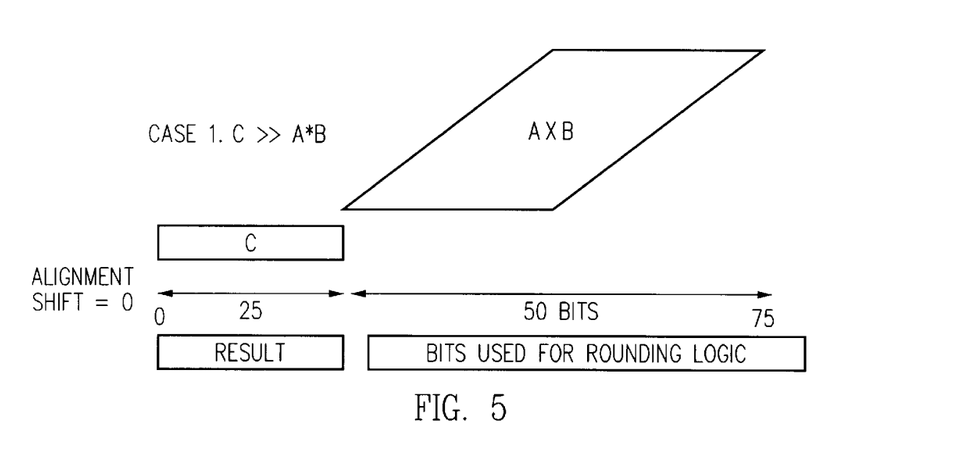
FIG. 5 illustrates the alignment shift when $C>>A*B$.

C': Aligned C
Case a: C is much greater than A*B
Case b: C is much less than A*B
S: Sign or encoded Sign
Sd: Encoded Sign Accordingly, if C>>A*B, then there would be no alignment shift of C, and the final result would simply be the first 25 bits of C, as shown in FIG. 5. There is no need for adding to or subtracting from A*B, since A*B is insignificant compared to C. A*B would then only be used for the sticky bits and rounding. In this first situation, the 25 most significant bits of C are applied to multiplexer 68.

Multiplexer 68 forwards these 25 most significant bits to its output based upon a control signal 69 indicating that the first exponent relationship exists in Table I.

The output of multiplexer 68 is connected to both an input of multiplexer 70 and to an input of an increment by one circuit 72. The increment by one circuit 72 adds one to the aligned operand C if it is a negated number to complete the two's complement conversion for case 5. For cases 1 and 2, the increment by one circuit 72 adds a carry out bit from adder 78. Multiplexer 70 is controlled by signal 73 to pass one of its two inputs depending upon whether case 1, 2, or 5 exists.

The 25 most significant bits of C are then applied to the 25 most significant bit positions of the post normalizer 24. The post normalizer 24 is 75 bits long, with the 25 most significant bits being reserved for the operand C if C>>A*B or C>A*B, and the remaining 50 bits being reserved for the bits in the result A*B±C output by adders 78 and 80. In the situation where C>>A*B, the A*B result in the remaining 50 bits in the post normalizer 24 are used for rounding. The number in the post normalizer 24 is not shifted if C>>A*B, as illustrated in Table III.

The subsequent operations performed on the number output from the post normalizer 24 will be described later in the context of the third situation where C≈A*B.

Figure 6:
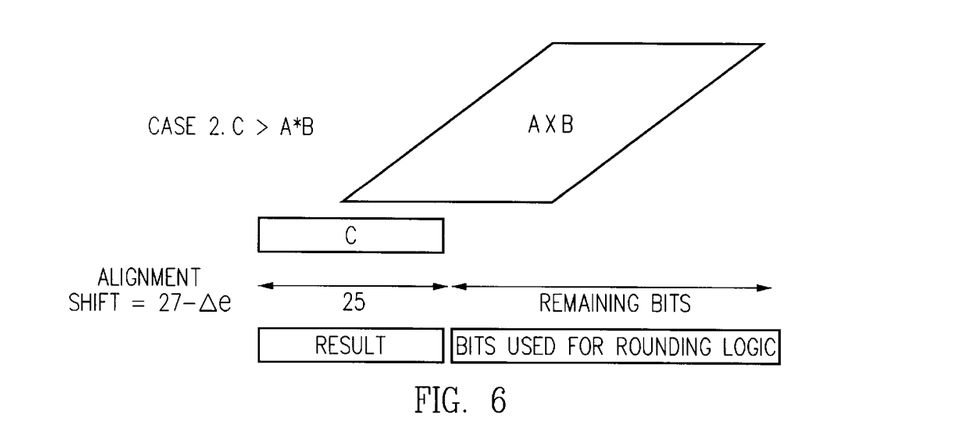
FIG. 6 illustrates the alignment shift when $C>A*B$.

Assuming that the second situation applies where C>A*B, as shown in FIG. 6, C is then shifted to the right $27 - \Delta e$ by aligner 18. In such a case, the product A*B becomes significant and should be added to the aligned operand C. In this case the 25 most significant bits (including the sign bit) in the aligned C are passed through mux 68 as previously described. In addition, the middle 50 bits in the aligned C are applied, along with the product A*B, to the carry select adder 76. Adder 76 may be any type of suitable adder. In the preferred embodiment, adder 76 converts the sum and carry bits from multiplier 14 and the middle 50 bits of the aligned C into a sum bit output and a carry bit output. The sum and carry bits are then added using adder 78.

The most significant 25 bits of the aligned C are applied, via mux 68, to the most significant 25 bit positions in the post normalizer 24, followed by the next 50 bit positions from adder 78.

The various bits are synchronized by the clock signals CLK1 and CLK2 using sync circuits 81 through 86.

The post normalization count logic circuit 32 then shifts the number in the post normalizer 24 by the amount identified in Table III below, as specified by the ALIGNCNT and ADDER CASES signals.

TABLE III

| $\Delta e = e_c - e_x$ | PN count |
|---|---|
| $\Delta e \geq 27$ (C >> A*B) | 0 |
| $27 > \Delta e > 0$ (C > A*B) | $27 - \Delta e$ |
| $\Delta e = 0, 1, 2, -1$ (C $\approx$ A*B) | 27+LZA/LOA |
| $1 > \Delta e \geq -48$ (C < A*B) | 27+LZA/LOA |
| $-48 > \Delta e$ (C << A*B) | 27+LZA/LOA |

Figure 7:
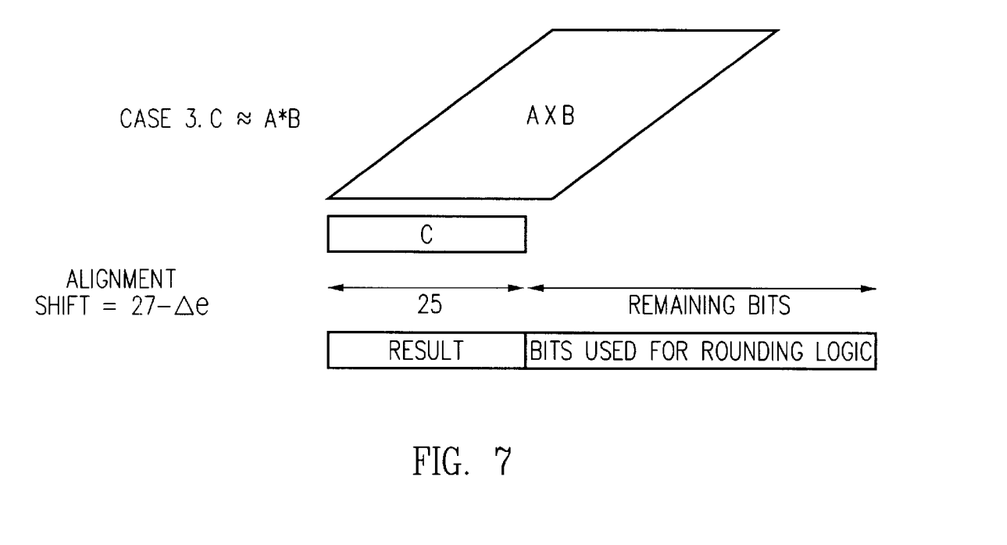
FIG. 7 illustrates the alignment shift when C is within two exponent values of $A*B$.

In the third situation where the exponent of C is either equal to that of A*B or +1, +2, or −1 of the exponent of A*B, shown in FIG. 7, there is a potential of mass cancellation of bit values such that there will likely be a string of leading ones or a string of leading zeroes. The sum and carry from the adder 76 are applied to the LOA/LZA 28. Multiplexer 30 is controlled as previously described with respect to mux 30 in FIG. 1 to output the count for either the LOA or LZA, depending upon the most significant bit of the adder 78 output.

The leading zero count or leading one count is then applied to the post normalization count logic 32. When this third situation (C≈A*B) exists, the ALIGNCNT signal and ADDER CASES signal identify that the LOA/LZA signals are to provide the shifting count in accordance with Table III.

The output of the post normalization count logic 32 then shifts the binary number in the post normalizer 24 to delete the leading zeros or ones so that the result is normalized.

Accordingly, the LOA/LZA 28 predicts the number of leading zeroes or leading ones applied to the post normalizer 24. This improves the speed of the FPU by detecting the leading ones and zeroes in parallel with the addition. The accuracy of the leading one or leading zero prediction is within one bit position, and further adjustment after the coarse post normalization is done by the fine post normalization logic to be described later. The LOA/LZA 28 operates as follows.

The LOA/LZA 28 receives a 50-bit sum number and a 50-bit carry number. Its output is a 6-bit count for leading zeroes and a 6-bit count for leading ones. The LOA/LZA 28 contains logic circuits generally similar to those in a carry tree in a carry look-ahead adder, whose structure after the following description would be understood by those skilled in the art.

Figure 8:
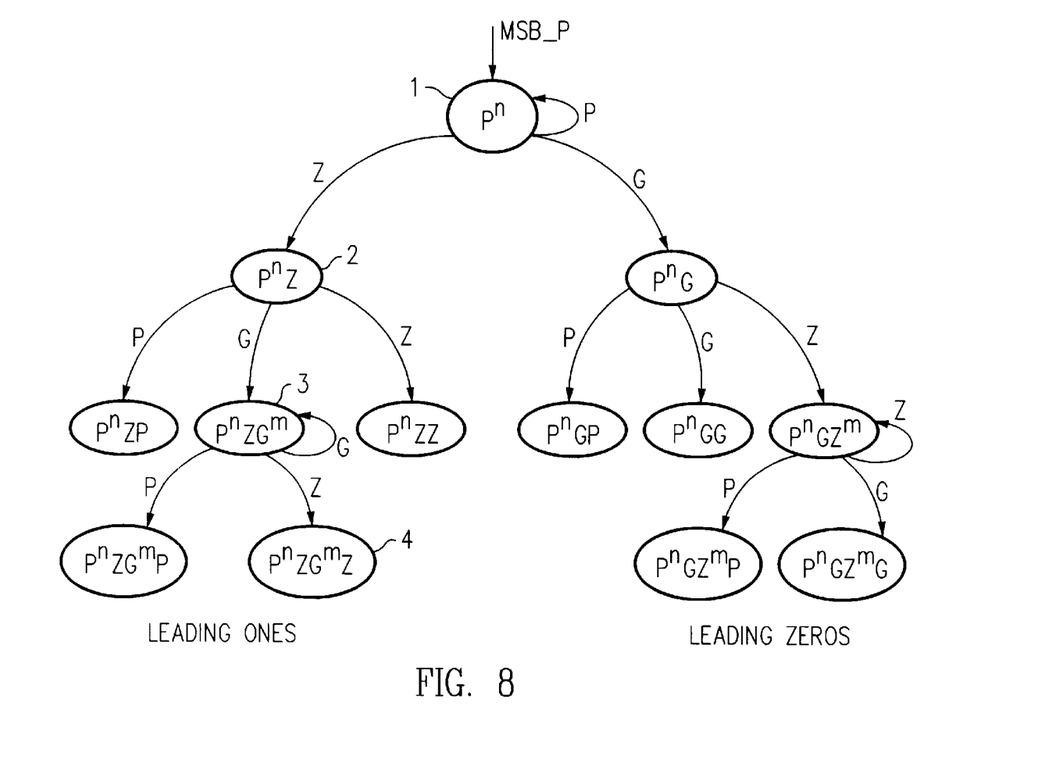
FIG. 8 illustrates a logic process carried out by the leading zero/one anticipator.

FIG. 8 illustrates the process performed by the LOA/LZA 28. A propagate (P), generate (G), and zero (Z) bit is generated for each bit pair of the two numbers input into the LOA/LZA 28 until the process is terminated. The logical relationships for generating these bits values are listed below, where i is a bit position.

$P_i = X_i$ XOR $Y_i$ $G_i = X_i$ AND $Y_i$ $Z_i = X_i$ NOR $Y_i$

Starting from the most significant bit position of the two numbers into the LOA/LZA, it is determined whether the logical relationship between the two bits results in a P, G or Z bit. If C is being subtracted from A*B and the exponent of C qualifies for the third case, there will be mass cancellation. For this third case the result will be a P bit.

As shown in FIG. 8, if the relationship between the bits in the next lower bit position results in a Z bit, the process proceeds with the tree on the left side of FIG. 8, indicating leading ones. If the result is a G bit, the process proceeds with the tree portion on the right side of FIG. 8, indicating leading zeroes. If the result is a P, the process continues for the next lower bit positions until a Z or a G is obtained.

The process continues downward until the specified combinations of P, G and Z bits are generated, and the process is then terminated. For example, the process would terminate upon the generation of the combination PPZGGZ by traveling through steps 1, 2, 3, and 4.

The LOA/LZA 28 then converts the combination of the P, G, and Z bits generated into a 6-bit count by adding the number of n's and m's, identifying the number of repeated loops for the P, G, and Z bits, plus one. For example, the combination of bits PPZGGZ (i.e., $P^2ZG^2Z$), terminating in step 4 in FIG. 8, indicates the number of leading ones is five.

A similar tree having the first bit be a Z would be used for cases 4 and 5. One skilled in the art could easily create this tree just by identifying the combinations of P, G, and Z bits which correspond to leading ones and zeros.

The multiplexer 30 then passes the count for the leading ones or zeroes.

Upon the occurrence of the CLK2 and CLK1 pulses the 6-bit count is then input into the post normalization count logic circuit 32, which shifts the number in the post normalizer 24 the calculated amount.

If the number in the post normalizer 24 is negative, the normalized amount in the post normalizer 24 is complemented by the XOR gate 34.

If the MSB is 0, then the normalized number must be shifted by one by shifter 94. This shift does not occur if the MSB is a 1.

Multiplexer 100 is controlled to output the appropriate value applied to its inputs.

To complete the two's complement conversion if the result is negative, a 1 is added by the incrementer 102. The same incrementer 102 is also used for rounding. A control signal from a rounding logic circuit 112 controls multiplexer 104 to pass the appropriate input to another multiplexer 106 which determines whether the result (RT) forwarding value is to be the number output from mux 104, a zero for an underflow, or a maximum number for an overflow. An underflow and overflow detector (not shown) are also provided to detect whether the value of A*B±C exceeded the maximum or minimum threshold.

The above-described processing of the normalized number output from the post normalizer 24 is also performed for all situations other than when C>>A*B.

Figure 9:
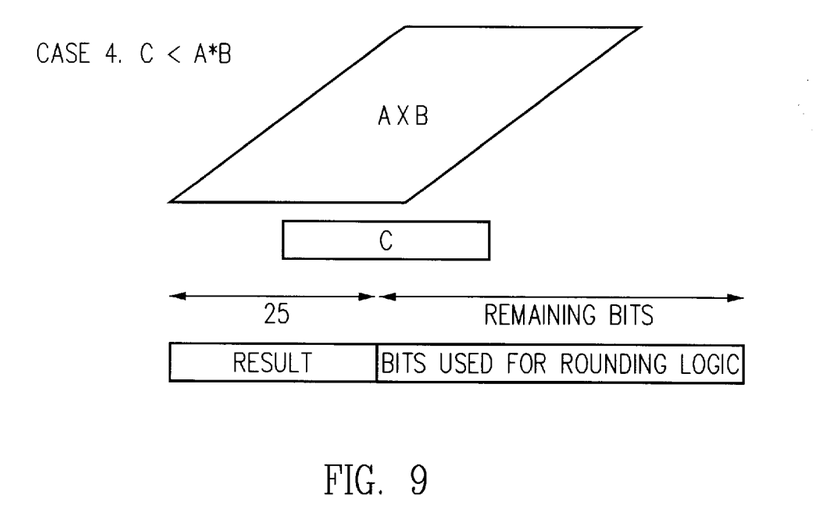
FIG. 9 illustrates the alignment shift when $C<A*B$.

The fourth situation, where C<A*B, is shown in FIG. 9, where the post normalization count is given in Table III. A*B and C are added by adders 76 and 78. The shifting of the result in the post normalizer 24 is in accordance with Table III. The 25 least significant bits in the aligned C are ORed together to generate the sticky A bit and are applied, via mux 68, to a rounding logic circuit 112 via lines 113. If the rounding logic circuit 112 determines that the number is to be rounded up, then circuit 112 controls mux 104 to output the number as incremented by incrementer 102.

Figure 10:
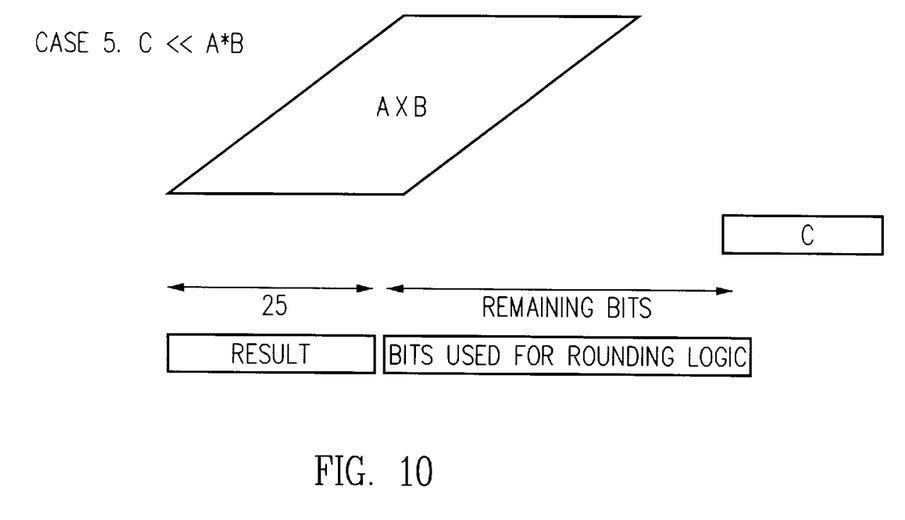
FIG. 10 illustrates the alignment shift when $C<<A*B$.

In the fifth situation where C<<A*B, shown in FIG. 10, the aligned C will only affect the rounding of the LSB of the product A*B. The 25 least significant bits of the operand C are applied to the multiplexer 68 and ultimately to the sticky bit detector 114, which ORs these LSBs and provides the signal to the rounding logic circuit 112. The most significant 25 bits in the post normalizer 24, after shifting in accordance with Table III, are then output. The least significant 50 bits output from the post normalizer 24 are analyzed by the sticky bit detector 116 to detect a sticky bit (one or more 1 bits within the 25 bit positions) for use in rounding the final result.

A sync circuit 118 outputs the resulting normalized number upon receipt of CLK2.

Figure 11:
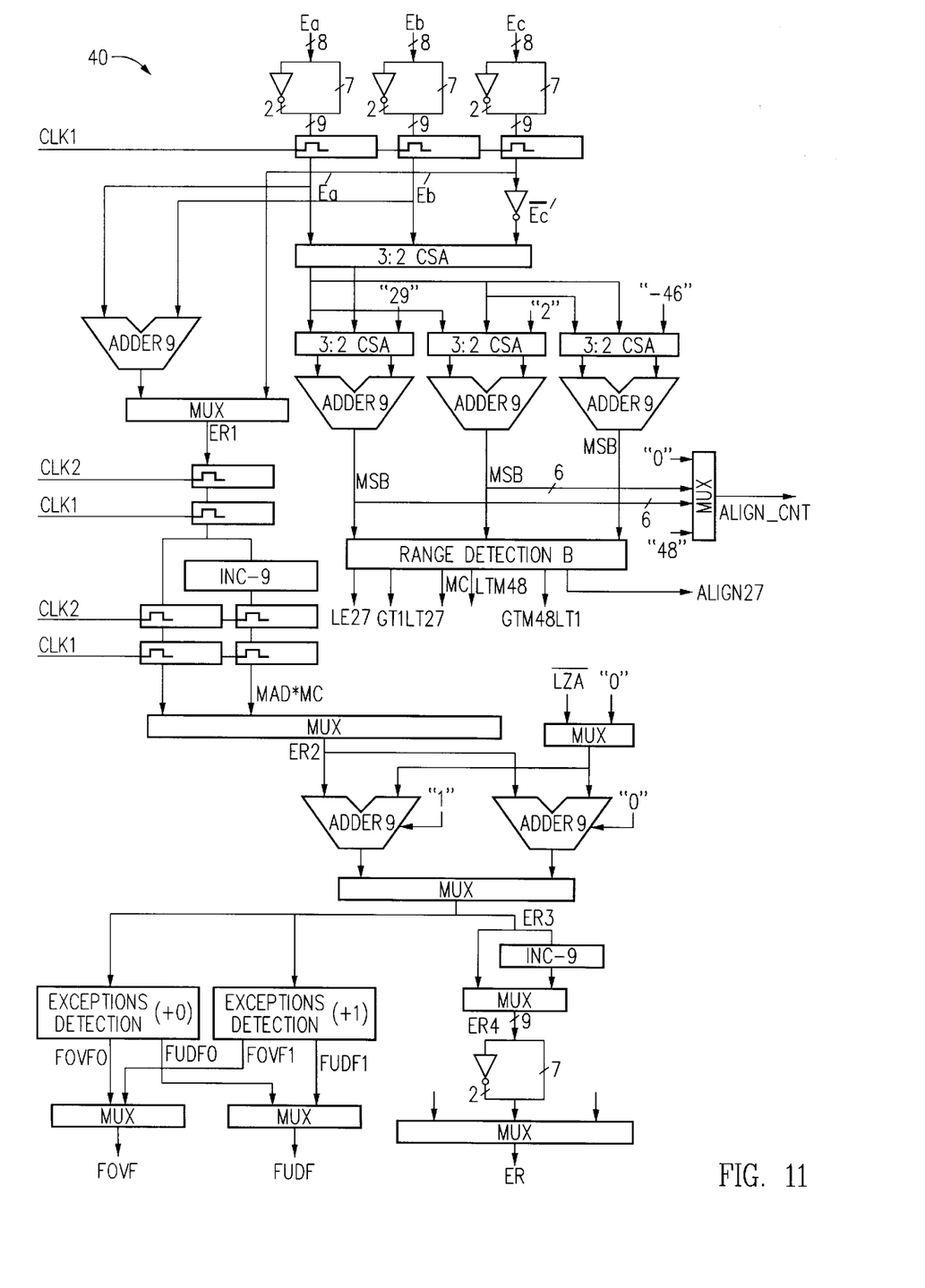
FIG. 11 is a detailed diagram of the exponent portion of FPU.

FIG. 11 illustrates in detail the exponent portion 40 of the FPU, whose operation is not necessary to understand the present invention. A more conventional exponent data path may also be used. One skilled in the art would understand the operation of the exponent portion of FIG. 11 given the brief discussion below.

According to the IEEE 754 floating point standard, a single precision floating point number uses an 8-bit unsigned excess 127 exponent (E), which is bits 30 through 23 in the format. In the exponent portion 40, all the calculations are done in the (E') domain, where E' can be obtained by inverting the MSB of E.

E: excess–127 exponent e: actual exponent e=E–127

E'=e–1=E–128=$\bar{E}$, E[7], E[6:0]

In the end, the exponent of the result is converted back to the E domain by inverting its MSB.

In the first stage, the three input exponents $E_a$, $E_b$ and $E_c$ are first converted to $E_a'$, $E_b'$ and $E_c'$. Then Δe is calculated as, $$\Delta e = e_a + e_b - e_c = E_a' + E_b' + \bar{E}_c' + 2$$

In addition to Δe, (Δe+27), and (Δe–48) are also computed for the purpose of range detection to determine which range Δe belongs to, as shown in Table IV.

TABLE IV

| Case | Range |
| --- | --- |
| case 1: $e_a + e_b \ll e_c$ | Δe ≧ –27 |
| case 2: $e_a + e_b < e_c$ | –27 > Δe > 0 |
| case 3: $e_a + e_b \cong e_c$ | Δe = 0, 1, 2, –1 |
| case 4: $e_a + e_b > e_c$ | 1 > Δe ≧ –48 |
| case 5: $e_a + e_b \gg e_c$ | –48 > Δe |

The only logic function performed in the second stage is adding three to generate the intermediate result $E_r$.

In the third stage, $E_r$ is adjusted based on the post-normalization leading zero count from the leading zero analyzer (LZA). Another adjustment is also made depending on the result of mantissa rounding overflow (FOVFRND). FOVFRND is asserted when there is a carry out from the MSB of the mantissa after rounding. The incrementing is performed then multiplexed with the unincremented value because FOVFRND arrives late in the stage. Two sets of overflow/underflow detections are performed in parallel for the same reason.

Figure 12:
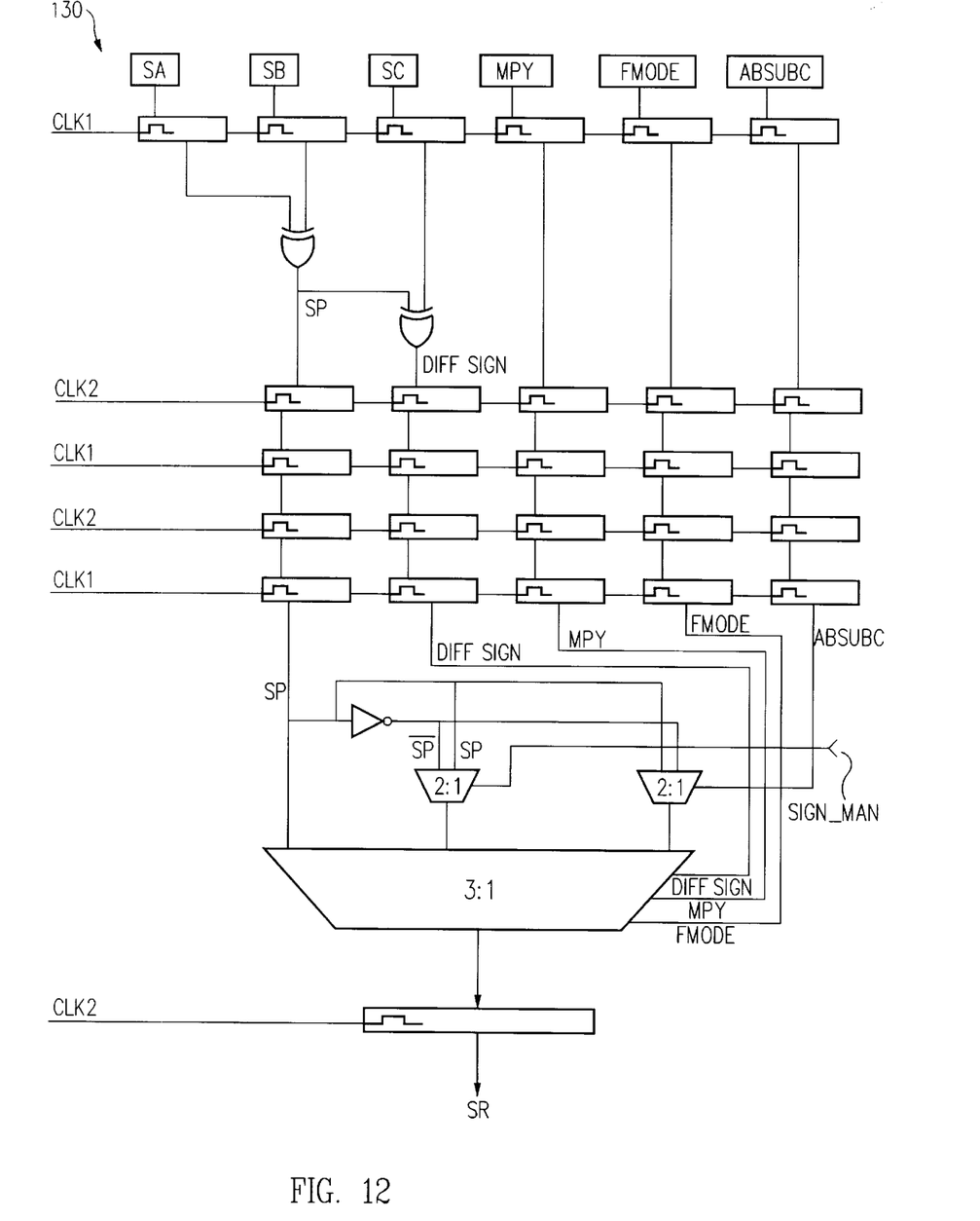
FIG. 12 is a detailed diagram of the sign portion of the FPU.

FIG. 12 illustrates the sign portion 130 of the FPU. The sign portion 130 generates the sign of the result of the multiply/add instruction based on the signs of the inputs and that of the mantissa result ($S_m$). The logic can be summarized as:

$S_a$, $S_b$, $S_c$: signs of A, B and C $S_p$: sign of A*B $S_m$: sign of the mantissa result $S_a = S_b$ XOR $S_b$.

Accordingly, a floating point unit (FPU) having a combined leading one and leading zero anticipator has been described. Further, an FPU which performs different operations depending upon the magnitude of the operand C relative to A*B is described which simplifies the FPU circuitry and increases the speed of the mantissa portion of the FPU.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A circuit in a floating point processor comprising:
    a multiplier connected to receive binary numbers A and B to generate a product A*B;
    an aligner connected to receive a binary number C, said binary number C having a fractional part and an exponent part, said aligner pre-shifting said binary number C to a leftmost position prior to the alignment, pre-shifting to said leftmost position reducing an exponent value;
    a carry save adder connected to outputs of said multiplier and said aligner, said carry save adder outputting sum and carry bits;
    an adder connected to an output of said carry save adder, said adder adding said sum and carry bits;
    a combined leading zero anticipator and leading one anticipator connected to an output of said carry save adder, said combined leading zero anticipator and leading one anticipator calculating leading ones or leading zeros of an output of said adder in parallel with said adder adding said sum and carry bits; and
    a post normalizer for receiving a binary number output from said adder and for shifting said output for normalizing, a shift control input of said post normalizer being connected to receive a signal related to an output of said combined leading zero anticipator and leading one anticipator for shifting the number stored in the post normalizer.

2. The circuit of claim 1 wherein said aligner determines at least one of three conditions, a first condition being whether C is much greater than a product of A and B, a second condition being whether C is approximately equal to a product of A and B, and a third condition being whether C is much less than a product of A and B,
    if said first condition is met, said aligner performing a zero shift of C,
    if said second condition is met, said aligner performing a variable shift, and
    if said third condition is met, said aligner performing a maximum right shift.

3. The circuit of claim 1 further comprising a means for complementing an aligned C for subtraction from A*B.

4. A circuit in a floating point processor comprising:
    a multiplier connected to receive binary numbers A and B to generate a product A*B;
    an aligner connected to receive a binary number C;
    a carry save adder connected to outputs of said multiplier and said aligner, said carry save adder outputting sum and carry bits;

an adder connected to an output of said carry save adder, said adder adding said sum and carry bits;

a combined leading zero anticipator and leading one anticipator connected to an output of said carry save adder, said combined leading zero anticipator and leading one anticipator calculating leading ones or leading zeros of an output of said adder in parallel with said adder adding said sum and carry bits; and a post normalizer for receiving a binary number output from said adder and for shifting said output for normalizing, a shift control input of said post normalizer being connected to receive a signal related to an output of said combined leading zero anticipator and leading one anticipator for shifting the number stored in the post normalizer;

wherein a result of said combined leading zero anticipator and leading one anticipator is not used in said floating point processor if it is determined that an exponent of (A*B) and an exponent of C are within two.

5. A method performed by a floating point processor comprising:

multiplying binary numbers A and B to obtain A*B;

aligning a binary number C to A*B, said binary number C having a fractional part and an exponent part, said step of aligning pre-shifting said binary number C to a leftmost position prior to alignment, pre-shifting to said leftmost position reducing an exponent value;

applying A*B and an aligned C to a carry save adder, said carry save adder adding A*B and an aligned C and outputting sum and carry bits;

applying said sum and carry bits to an adder, said adder adding said sum and carry bits;

applying said sum and carry bits to a combined leading zero anticipator and leading one anticipator connected to an output of said carry save adder, said combined leading zero anticipator and leading one anticipator calculating leading ones or leading zeros of an output of said adder in parallel with said adder adding said sum and carry bits; and shifting a binary number output from said adder for normalizing based on leading ones or leading zeros of said output of said adder.

6. The method of claim 5 wherein said step of aligning further comprises determining at least one of three conditions, a first condition being whether C is much greater than A*B, a second condition being whether C is approximately equal to A*B, and a third condition being whether C is much less than a A*B, if said first condition is met, said aligner performing a zero shift of C, if said second condition is met, said aligner performing a variable shift, and if said third condition is met, said aligner performing a maximum right shift.

7. The method of claim 5 further comprising complementing an aligned C if C is to be subtracted from A*B.

8. A method performed by a floating point processor comprising:

multiplying binary numbers A and B to obtain A*B;

aligning a binary number C to A*B;

applying A*B and an aligned C to a carry save adder, said carry save adder adding A*B and an aligned C and outputting sum and carry bits;

applying said sum and carry bits to an adder, said adder adding said sum and carry bits;

applying said sum and carry bits to a combined leading zero anticipator and leading one anticipator connected to an output of said carry save adder, said combined leading zero anticipator and leading one anticipator calculating leading ones or leading zeros of an output of said adder in parallel with said adder adding said sum and carry bits; and shifting a binary number output from said adder for normalizing based on leading ones or leading zeros of said output of said adder;

wherein a result of said combined leading zero anticipator and leading one anticipator is not used in said floating point processor if it is determined that an exponent of (A*B) and an exponent of C are within two.

* * * * *